(12) United States Patent
Lumbab

(10) Patent No.: US 9,885,314 B2
(45) Date of Patent: Feb. 6, 2018

(54) DUAL-CAM BELLCRANK MECHANISM

(71) Applicant: The Boeing Company, Chicago, IL (US)

(72) Inventor: Alex C. Lumbab, Bothell, WA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 14/635,625

(22) Filed: Mar. 2, 2015

(65) Prior Publication Data

US 2016/0258385 A1    Sep. 8, 2016

(51) Int. Cl.
  *F16H 21/00* (2006.01)
  *F02K 1/15* (2006.01)
  *F02K 1/76* (2006.01)
  *B05B 1/04* (2006.01)
  *F16H 25/18* (2006.01)

(52) U.S. Cl.
  CPC ............. *F02K 1/15* (2013.01); *B05B 1/04* (2013.01); *F02K 1/763* (2013.01); *F16H 25/18* (2013.01); *F05D 2260/56* (2013.01); *Y02T 50/672* (2013.01)

(58) Field of Classification Search
  CPC ... F02K 1/15; F02K 1/763; B05B 1/04; F16H 25/18
  See application file for complete search history.

(56) References Cited

U.S. PATENT DOCUMENTS

| | | | | |
|---|---|---|---|---|
| 2,597,354 A | * | 5/1952 | Maloney | H01J 9/46 140/71.6 |
| 2,734,387 A | * | 2/1956 | Jansen | H01H 9/0027 74/526 |
| 2,840,310 A | * | 6/1958 | Christoff | G06C 7/08 235/60 C |
| 2,893,026 A | * | 7/1959 | Sillars | B29C 45/14467 118/300 |
| 2,948,906 A | * | 8/1960 | Pulsifer | A43D 87/00 12/17.2 |
| 3,174,700 A | * | 3/1965 | Lemaire | B21C 47/04 242/129.51 |
| 3,259,341 A | * | 7/1966 | Steidl | B64C 23/005 244/207 |

(Continued)

OTHER PUBLICATIONS

Extended European Search Report issued in European Patent Application No. 16158214.3 dated Jun. 30, 2016.

*Primary Examiner* — Zakaria Elahmadi
(74) *Attorney, Agent, or Firm* — McDonnell Boehnen Hulbert & Berghoff LLP

(57) ABSTRACT

A method and system for imparting a linear motion to a flexible shaft is disclosed. The system includes a bellcrank having a first arm, a second arm, and a first pivot pin therebetween. The system further includes an actuating device coupled to the first arm and configured to apply a force to cause the bellcrank to rotate about the first pivot pin. Still further, the system includes a second pivot pin coupled to a rod-end of the flexible shaft and further coupled to a slotted hole on the second arm. Yet still further, the system includes a follower surface on the rod-end of the flexible shaft and configured to slide on a cam surface machined on the second arm. Upon application of the force to the first arm, the flexible shaft moves in a substantially linear motion.

19 Claims, 16 Drawing Sheets

(56) References Cited

U.S. PATENT DOCUMENTS

| | | | | |
|---|---|---|---|---|
| 3,478,987 A | * | 11/1969 | Dorand | B64C 23/005 244/17.25 |
| 3,818,771 A | * | 6/1974 | Kobelt | F16H 25/18 74/567 |
| 4,043,509 A | * | 8/1977 | McHugh | F02K 1/1269 239/265.41 |
| 6,026,865 A | * | 2/2000 | Krumm | D03D 47/125 139/453 |
| 8,884,457 B1 | * | 11/2014 | Jones | F03B 17/06 290/43 |
| 9,061,753 B2 | * | 6/2015 | Beyer | B64C 9/10 |
| 2005/0129510 A1 | * | 6/2005 | Raine | F01D 17/162 415/155 |
| 2010/0084905 A1 | * | 4/2010 | Silbereisen | B60N 2/4814 297/410 |
| 2011/0182716 A1 | * | 7/2011 | Bouru | F01D 17/16 415/148 |
| 2012/0137654 A1 | * | 6/2012 | Burgess | F02K 1/06 60/204 |
| 2013/0020408 A1 | * | 1/2013 | Jasklowski | B25J 5/007 239/265.11 |
| 2014/0030069 A1 | * | 1/2014 | Little | F04D 29/563 415/148 |
| 2014/0133968 A1 | * | 5/2014 | Holchin | F01D 17/162 415/148 |
| 2016/0016493 A1 | * | 1/2016 | Deppe | B60N 2/0232 297/378.12 |

* cited by examiner

DUAL-CAM BELLCRANK MECHANISM

BACKGROUND

Unless otherwise indicated herein, the materials described in this section are not prior art to the claims and are not admitted to be prior art by inclusion in this section.

A bellcrank is a device that is used to change the direction of movement and/or impart a mechanical advantage in a system. In an example, a bellcrank is used to change rotary motion to linear motion. Generally, a bellcrank may be used in any mechanical system where it is desired to change motion from one direction to another. Bellcranks are thus common in a variety of industries, including but not limited to the aerospace industry, the automotive industry, the construction industry, and the agricultural industry.

As a particular example, bellcranks are commonly used in the aerospace industry for systems that modulate fan flow in a turbofan engine by varying the exit or throat area of a nozzle at the trailing edge of a fan duct or thrust reverser sleeve. Such systems will be referred to herein as variable area fan nozzles (VAFNs). In particular, bellcranks are commonly used in VAFNs for turbofan engine nacelles so as to control the amount of opening and the rate at which the fan nozzle throat area changes. In an example VAFN, the VAFN includes an array of elastically deformable petals attached to a lip area at the downstream end of a thrust reverser sleeve. In other examples, pivotable rigid petals can be substituted for elastically deformable petals. In either case, petal deflection can be actuated using one or more flexible push-pull shafts (e.g., cables) which extend around a major portion of the fan nozzle circumference. An actuation system controls the deformation or deflection of the petals, thereby controlling the amount of opening and the rate at which the fan nozzle throat area changes. Alternatively, the cables can be replaced with rods, tubes or bands made of composite material.

VAFNs commonly include one or more bellcranks that actuate the flexible push-pull shafts. However, the typical VAFN bellcrank that actuates a flexible push-pull shaft has a number of drawbacks. For instance, one issue is that existing bellcrank arrangements impart side loading on the flexible shaft. The flexible shaft may be unsupported at the rod end. Since the flexible shaft is unsupported at the rod end, the flexible shaft is subject to side-loading due to the rotating motion of the bellcrank about its pivot point which moves the flexible shaft along a corresponding arc. Side loads may impact the functionality of the flexible shaft. For instance, side loads may lead to fatigue on the flexible shaft.

An existing solution for reducing or preventing side load on the flexible shaft is to incorporate a crank-slider or a cam mechanism in the bellcrank system. However, a drawback of this approach is that the crank slider or cam mechanism is external to the bellcrank, and an external crank slider or cam mechanism thus increases the size of the mechanical system. Since there is limited area within the VAFN, this increased size is undesirable. Further, another drawback of this approach is that the additional crank-slider or cam components and hardware that are used to secure the parts to the bellcrank mechanical system add considerable weight to the system.

BRIEF SUMMARY

A method and system for imparting a linear motion to a flexible shaft is disclosed. In an example embodiment, a system includes a bellcrank having a first arm, a second arm, and a first pivot pin therebetween. The system further includes an actuating device coupled to the first arm and configured to apply a force to cause the bellcrank to rotate about the first pivot pin. Still further, the system includes a second pivot pin coupled to a machined rod-end of the flexible shaft and further coupled to a slotted hole on the second arm. Yet still further, the system includes a follower surface on the rod-end of the flexible shaft and configured to slide on a cam surface machined on the second arm. Upon application of the force to the first arm, the flexible shaft moves in a substantially linear motion.

In another example embodiment, a system for imparting a linear motion to a flexible shaft includes a bellcrank having a first arm, a second arm, and a first pivot pin therebetween. The system further includes an actuating device coupled to the first arm and configured to apply a force to cause the bellcrank to rotate about the first pivot pin. Still further, the system includes a second pivot pin coupled to a machined rod-end of the flexible shaft and further coupled to a slotted hole on the second arm. Yet still further, the system includes a first follower surface on the rod-end of the flexible shaft and configured to slide on a first cam surface machined on the second arm. And yet still further, the system includes a second follower surface on the rod-end of the flexible shaft and configured to slide on a second cam surface machined on the second arm, wherein the second follower surface is located on an opposite side of the rod-end of the flexible shaft as the first follower surface. Upon application of the force to the first arm, the flexible shaft moves in a substantially linear motion.

In yet another example embodiment, a method for manufacturing a system comprising a bellcrank coupled to an end of a flexible shaft, the bellcrank comprising a first arm, a second arm and a pivot therebetween is provided. The method includes selecting (i) a shape of a cam surface for the second arm of the bellcrank and (ii) a shape of a follower surface for a rod-end of the flexible shaft, wherein a shape of the follower surface and a shape of the cam surface are selected such that upon application of force to the first arm, the flexible shaft will move in a substantially linear motion. The method also includes machining, or some other fabrication method, the cam surface on the second arm of the bellcrank and machining the follower surface on the rod-end of the flexible shaft.

The features, functions, and advantages can be achieved independently in various embodiments of the present disclosure or may be combined in yet other embodiments in which further details can be seen with reference to the following description and drawings.

DETAILED DESCRIPTION

Figure 1:
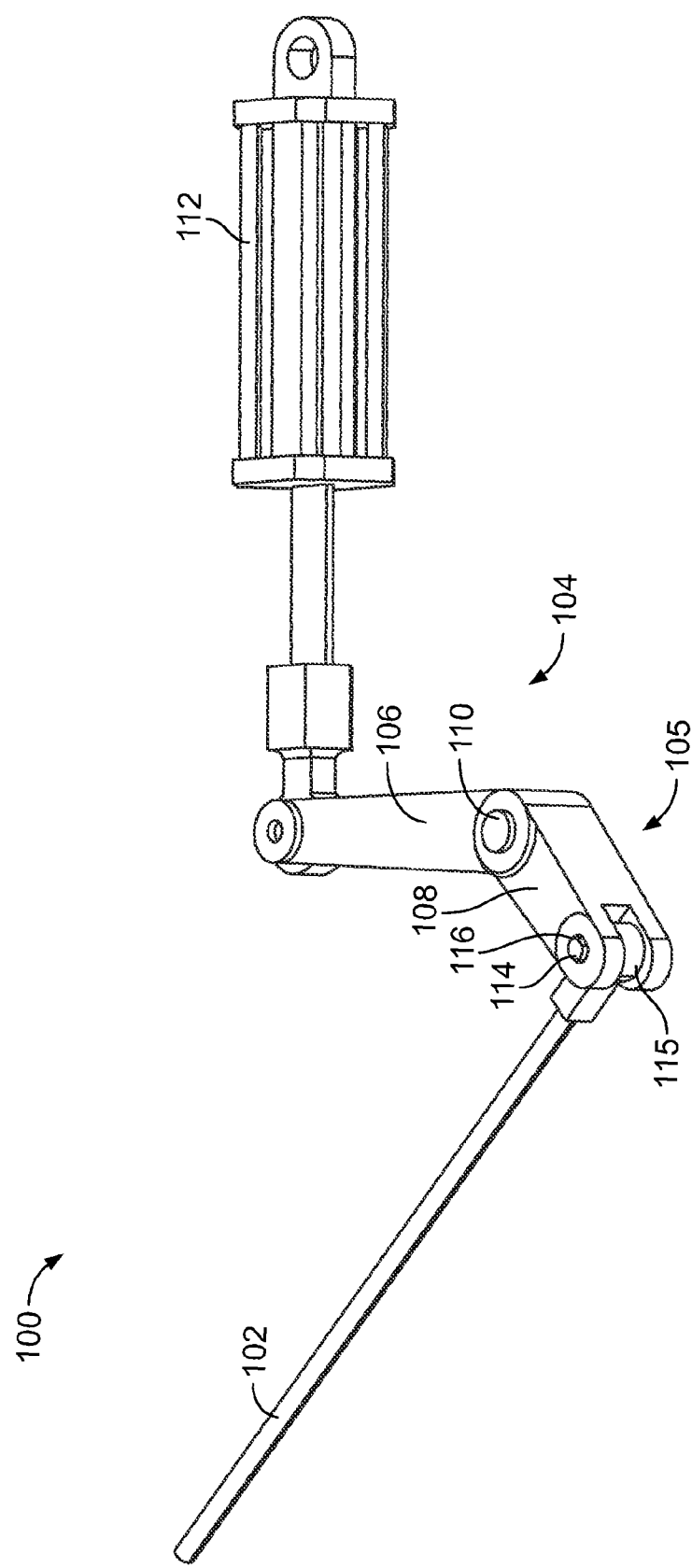
FIG. 1 depicts a diagrammatic representation of a perspective view of a bellcrank system in accordance with an exemplary embodiment.

1. Overview of Example Methods and Systems

The disclosed methods and systems provide a bellcrank mechanism that allows for substantially linear motion of the flexible shaft upon application of a force that rotates the bellcrank. Thus, the disclosed embodiments provide an improved bellcrank that reduces or eliminates side loading that would normally be imparted onto the flexible shaft by a rotating bellcrank.

The methods and systems in accordance with the present disclosure beneficially reduce or eliminate side loading imparted onto the flexible shaft by allowing the flexible shaft rod-end to be forced into a linear motion via a dual-cam mechanism contained within the bellcrank. By forcing the flexible shaft rod end to actuate in a straight line of motion as the bellcrank rotates, this substantially reduces or eliminates the side loading imparted onto the flexible shaft.

An example system in accordance with the present disclosure includes a bellcrank having a first arm, a second arm, and a first pivot pin therebetween. The system further includes an actuating device coupled to the first arm and configured to apply a force to cause the bellcrank to rotate about the first pivot pin. Still further, the system includes a second pivot pin coupled to a rod-end of the flexible shaft and further coupled to a slotted hole on the second arm. Yet still further, the system includes a follower surface on the rod-end of the flexible shaft and configured to slide on a cam surface machined on the second arm. Upon application of the force to the first arm, the flexible shaft moves in a substantially linear motion.

The proposed bellcrank is referred to herein as a "dual-cam bellcrank mechanism." This proposed bellcrank is a dual-cam bellcrank because the proposed bellcrank includes two cams within the clevis of the bellcrank itself. In particular, the first cam is the slotted hole. Further, the second cam is the cam surface machined on the second arm and configured to interact with the follower surface on the rod-end of the flexible shaft. The slotted hole is machined into the lugs of the bellcrank clevis to allow the second pivot pin to slide laterally within the slotted hole. Since the push-pull flexible shaft is unsupported at the rod-end, any reaction load would tend to push the pin to one side of the slotted hole. To counter this lateral movement, the second cam mechanism is included to force the pin to track in a straight line as the bellcrank rotates. This second cam is machined into what is traditionally a flat portion of the bottom of the clevis. The second cam impinges on the rod end of the flexible shaft and it tracks to a resulting straight line of motion so as to reduce or eliminate side-loading of the flexible shaft.

Beneficially, this dual-cam arrangement where both cams are formed within the clevis of the bellcrank itself provides for both a compact and lightweight design. In particular, this compact solution allows for a lightweight mechanism that can be contained within very constrained spaces, such as constrained spaces typically found in a turbofan engine nacelle structure. Further, disclosed methods and systems beneficially reduce or eliminate side loading on the flexible shaft by providing for substantially linear motion for the flexible shaft.

2. Example Bellcrank Systems

FIG. 1 depicts a bellcrank system 100 in accordance with an exemplary embodiment. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 2A:
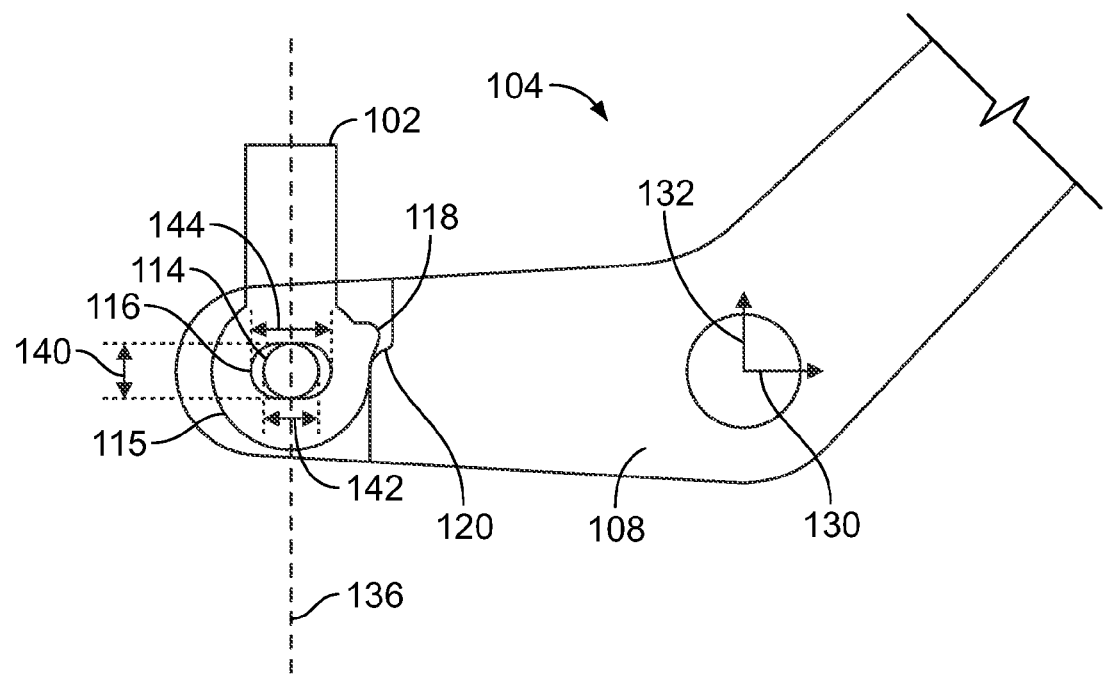
FIGS. 2*a*-2*k* are each a diagrammatic representation of a top view of a cross section of the bellcrank system shown in FIG. 1.

The bellcrank system 100 is a dual-cam bellcrank mechanism that imparts a linear motion to a shaft, such as flexible shaft 102. The bellcrank system 100 includes a bellcrank 104 having a first arm 106, a second arm 108, and a first pivot pin 110 therebetween. The system 100 further includes an actuating device 112 coupled to the first arm 106 and configured to apply a force to cause the bellcrank 104 to rotate about the first pivot pin 110. The system 100 also includes a second pivot pin 114 coupled to a rod-end 115 of the flexible shaft 102 and further coupled to a slotted hole 116 on the second arm 108. With reference to FIG. 2*a*, the system 100 further includes a follower surface 118 on the end of the flexible shaft and configured to slide on a cam surface 120 machined on the second arm 108. Upon application of the force to the first arm 106, the flexible shaft 102 moves in a substantially linear motion. The follower surface 118 is a projection on the end of the flexible shaft 102. Further, the cam surface 120 is a track machined on the second arm 108.

In an example embodiment, the flexible shaft 102 is a flexible shaft of a VAFN. Further, the actuating device 112 may be any actuator that is configured to apply force to the first arm 106 of the bellcrank. Generally, the actuating device 112 is any suitable device capable of applying such a force. In an example embodiment, the actuating device 112 includes a motor and a shaft driven by the motor. The shaft is coupled to the first arm 106, and the motor drives the shaft of the bellcrank as desired. In an example embodiment, the actuating device is a linear actuator that is powered by an electric, hydraulic, or pneumatic source. Other power sources are possible as well. In an example, an electric actuator is comprised of a linear motor or a rotary motor coupled to a lead/ball screw or rack-and-pinion mechanism to allow for linear actuation of the output piston rod. In an example, a hydraulic or pneumatic actuator is comprised of a piston rod which is actuated with either fluid (e.g., hydraulic oil) or air, respectively. The choice of actuator may have many variables, one of which would be availability of support infrastructure (i.e.—electric or hydraulic/pneumatic source) and the actuator sizing is dependent on the load-output requirement of the bellcrank into the flexible shaft taking into account, if available, any mechanical advantage inherent in the bellcrank configuration.

As mentioned above, the bellcrank system 100 is a dual-cam bellcrank that includes two cams within the clevis 105 of the bellcrank itself. With reference to FIG. 2a, the first cam is the slotted hole 116 and the second cam is the cam surface 120 machined on the second arm 108. This disclosed dual-cam arrangement forces the flexible shaft 102 to move along a substantially linear path as the bellcrank 104 is rotated.

As used herein, substantially linear motion indicates that the path of the flexible shaft follows a linear path and does not deviate from the linear path more than a threshold amount. In an example, the threshold amount is between about +/−0.001 and 0.005 inches. However, in other example embodiments, the threshold could be greater, such as a threshold between about +/−0.005 and 0.010 inches. In other examples, the threshold could be greater than about 0.010 inches. Other examples are possible as well. The threshold tolerance is highly dependent on machining tolerances and wear characteristics of the base materials. Over time, increased wear in material could gradually open up the tolerances as more clearance is generated in worn parts.

Figure 2B:
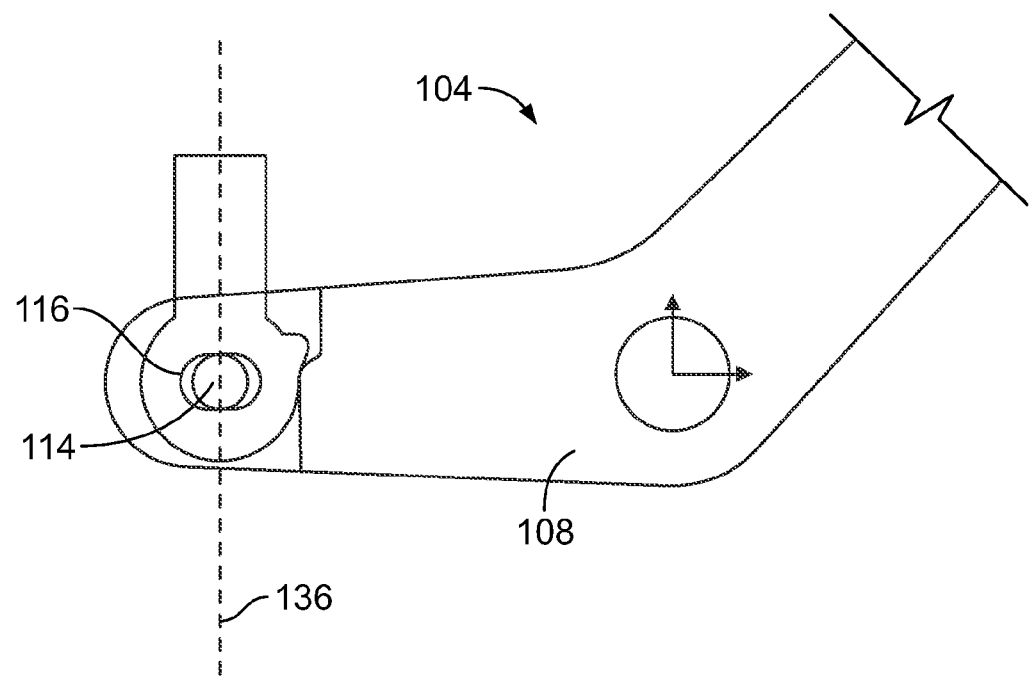
Figure 2C:
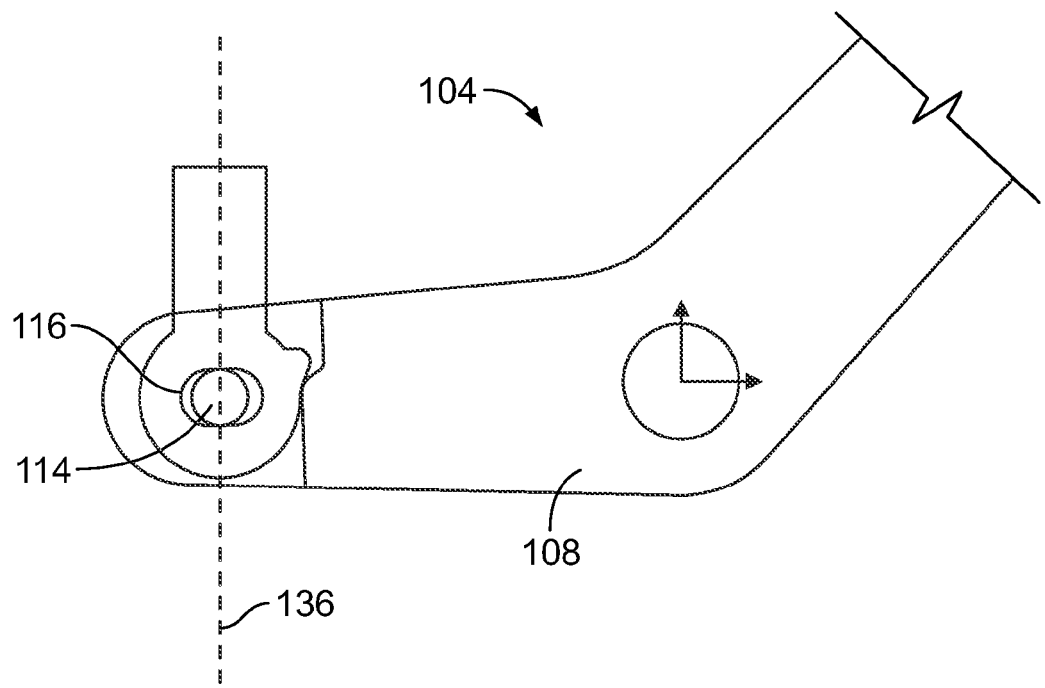
Figure 2D:
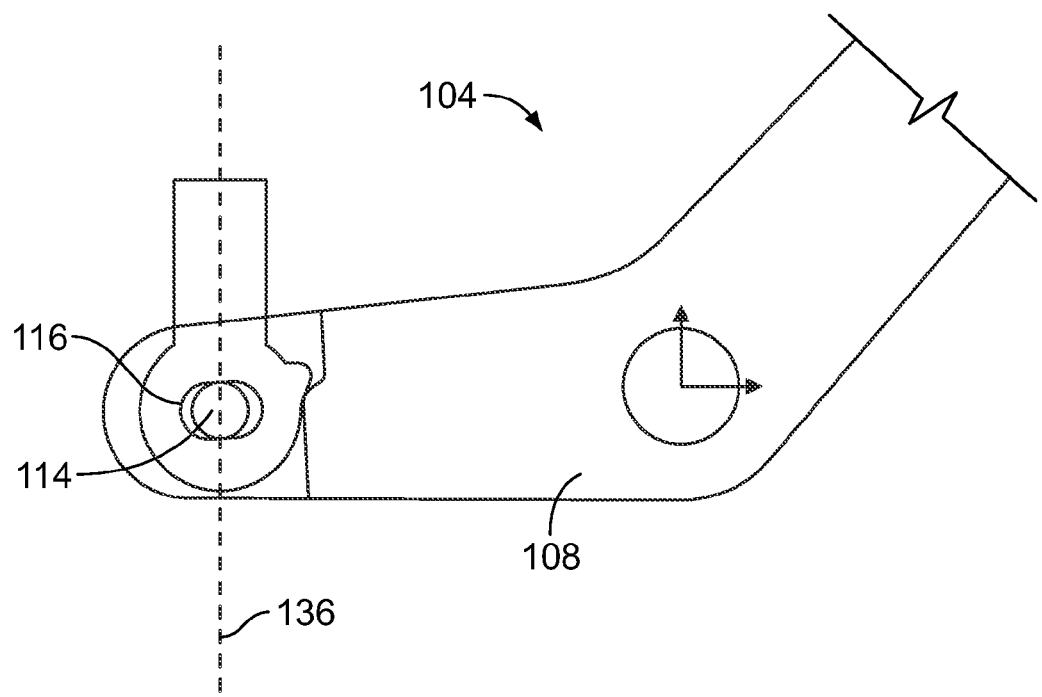
Figure 2E:
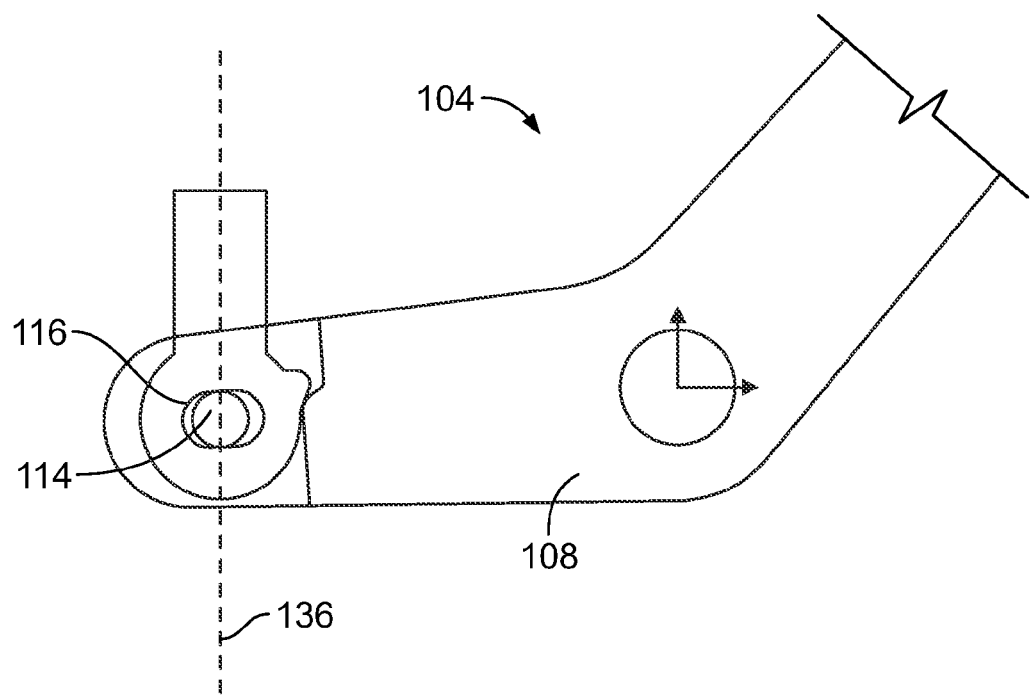
Figure 2F:
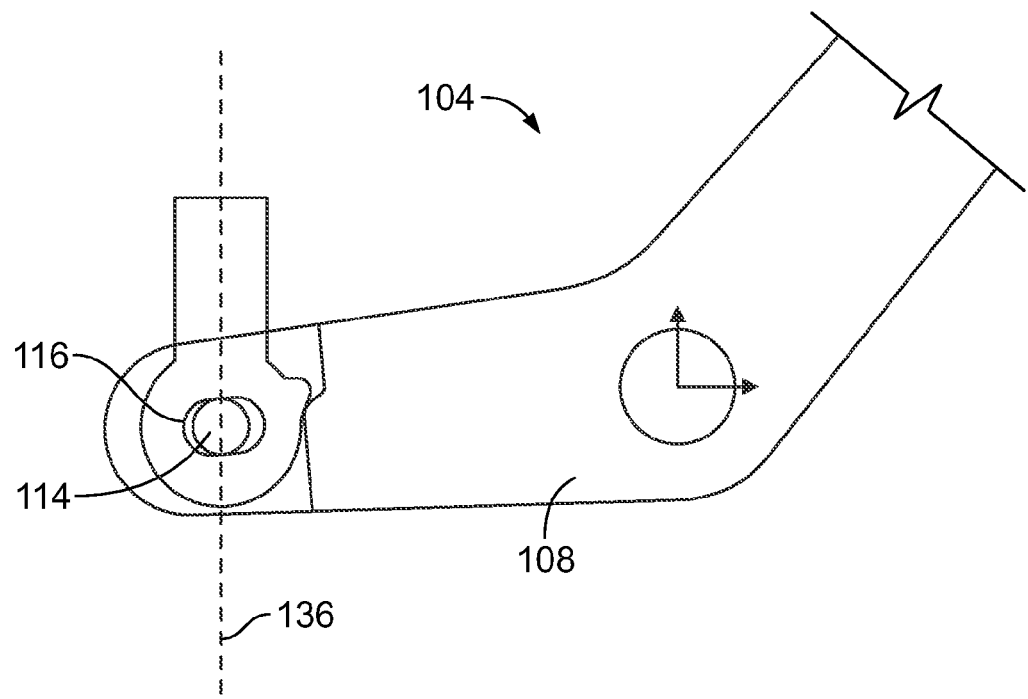
Figure 2G:
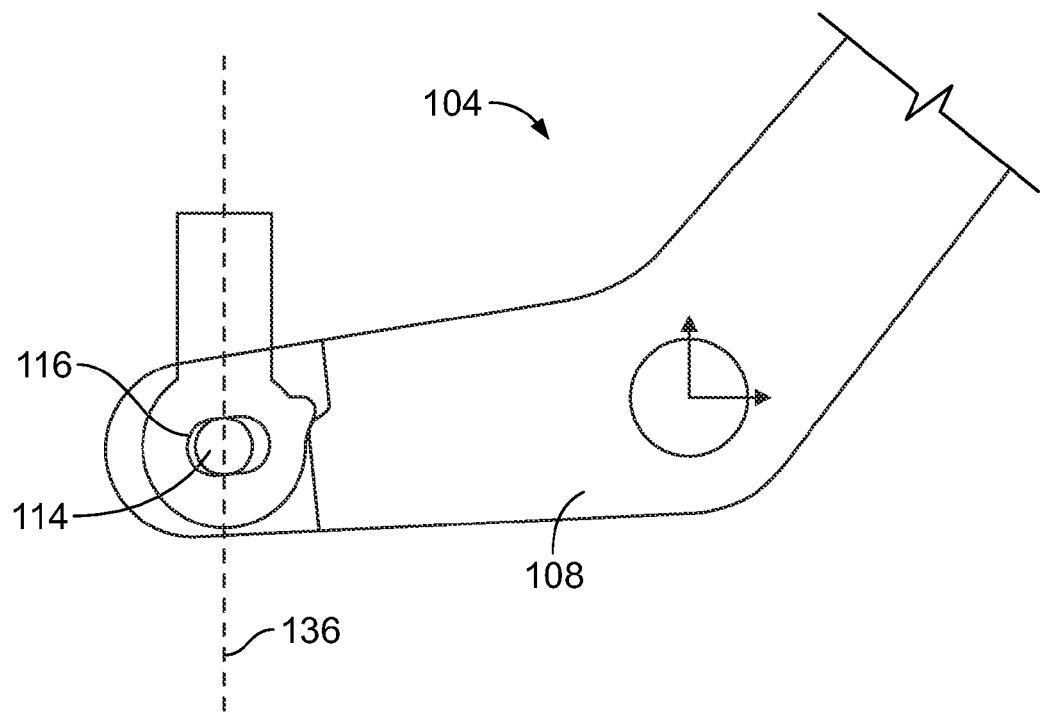
Figure 2H:
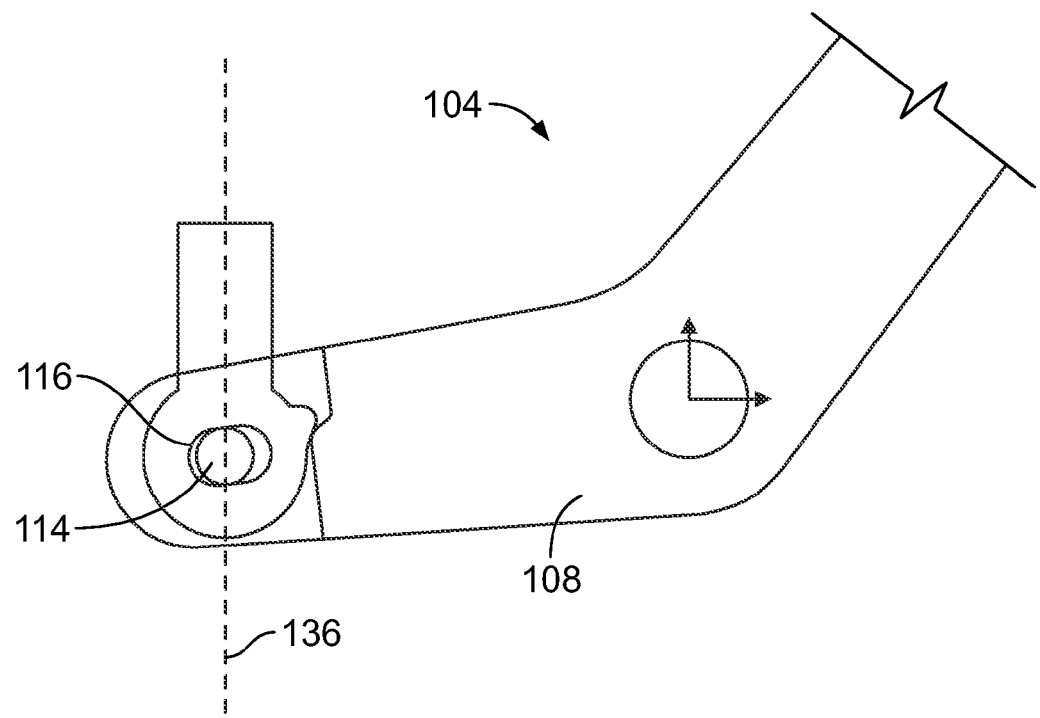
Figure 2I:
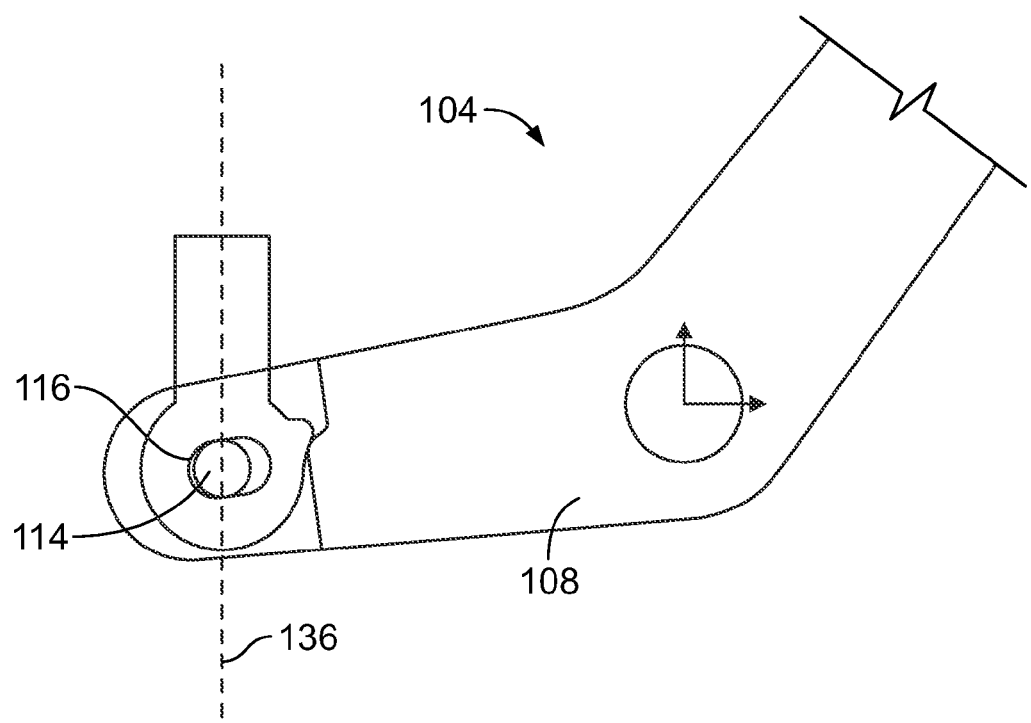
Figure 2J:
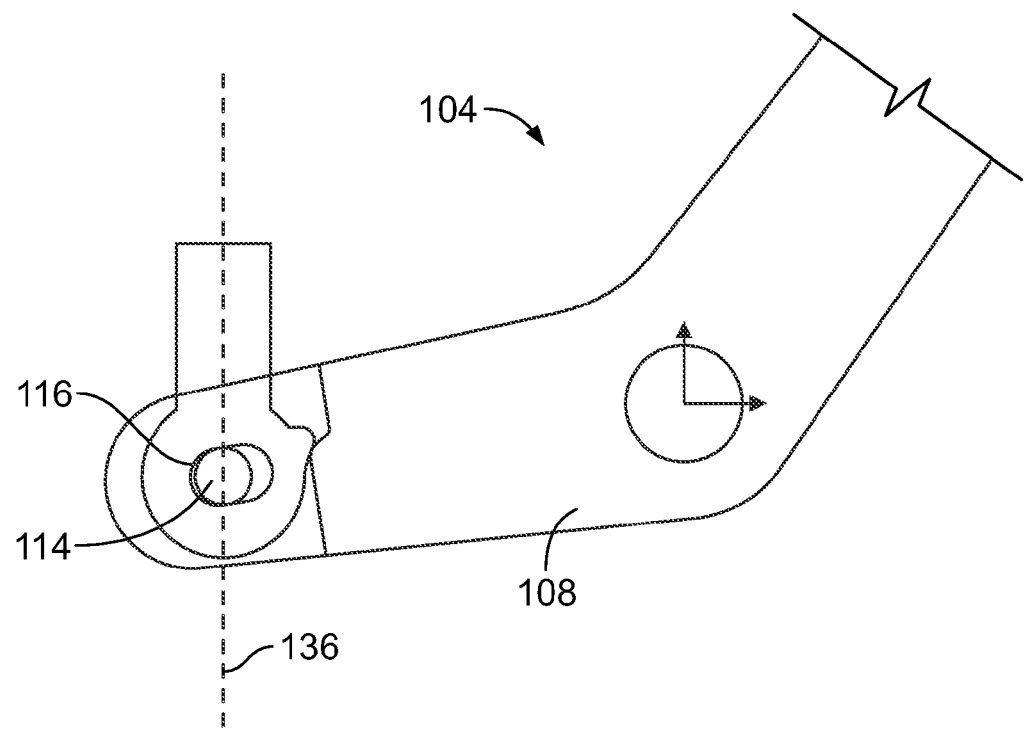
Figure 2K:
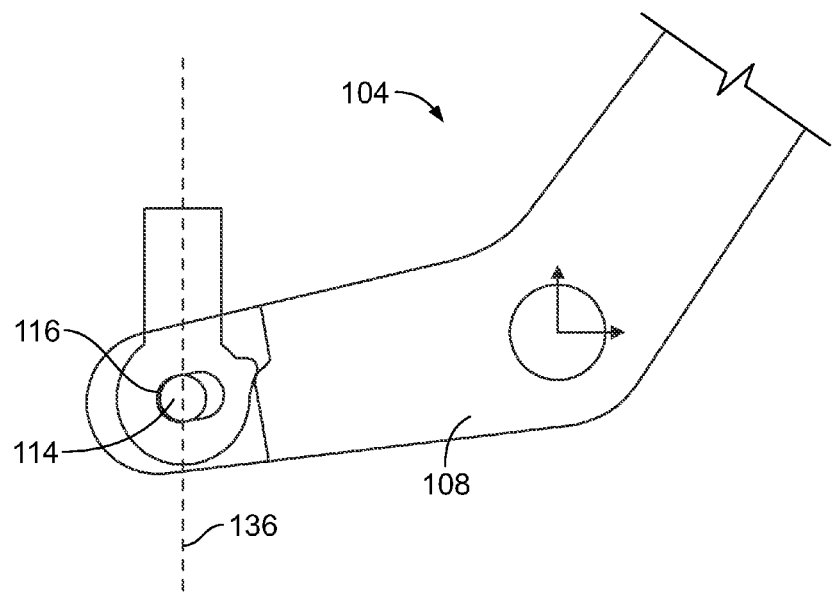

This substantially linear motion is described in further detail with reference to FIGS. 2a-2k. As shown in FIGS. 2a-2k, the bellcrank rotates about a Z-axis which is perpendicular to the XY plane, which is defined in the Figures by X-axis 130 and Y-axis 132. FIGS. 2a-2k each depict the bellcrank 104 at various degrees of rotation. In particular, FIG. 2a depicts the bellcrank at an initial state of operation before the actuating device 112 (see FIG. 1) applies force to rotate the bellcrank 104. After the actuating device 112 applies a force, the bellcrank 104 is rotated. In FIG. 2b, the bellcrank has been rotated about 1 degrees. Further, in FIG. 2c, the bellcrank has been rotated about 2 degrees. Still further, in FIG. 2d, the bellcrank has been rotated about 3 degrees. Yet still further, in FIG. 2e, the bellcrank has been rotated about 4 degrees. And yet still further, in FIG. 2f, the bellcrank has been rotated about 5 degrees. And yet still further, in FIG. 2g, the bellcrank has been rotated about 6 degrees. And yet still further, in FIG. 2h, the bellcrank has been rotated about 7 degrees. And yet still further, in FIG. 2i, the bellcrank has been rotated about 8 degrees. And yet still further, in FIG. 2j, the bellcrank has been rotated about 9 degrees. And yet still further, in FIG. 2k, the bellcrank has been rotated about 10 degrees.

As shown in these Figures, during this rotation, the flexible shaft 102 moves in a substantially linear motion along a substantially linear path. In particular, throughout the entire rotation of the bellcrank 104 about first pivot pin 110, the flexible shaft 102 follows a substantially linear motion along line 136 (which is a line parallel to the Y-axis 132).

The slotted hole 116 is sized such that it allows second pivot pin 114 to move laterally within the slotted hole. In an example embodiment, the slotted hole 116 has (i) a width 140 that substantially corresponds to a diameter 142 of the second pivot pin and (ii) a length 144 that is greater than the diameter 142 of the second pivot pin. As seen in FIGS. 2a-2k, the second pivot pin 114 (which is coupled to the rod-end 115 of the flexible shaft 102) follows line 136 throughout the rotation of the bellcrank, whereas the slotted hole 116 rotates and moves in a direction along the X-axis 130 relative to the pin. In particular, as seen from the Figures, the slotted hole 116 rotates and moves laterally relative to the second pivot pin 114 throughout the rotation of the bellcrank 104. In particular, during rotation, the slotted hole moves both along the Y-axis 132 and the X-axis 130, whereas the second pivot pin 114 only moves along the Y-axis 132.

Figure 3:
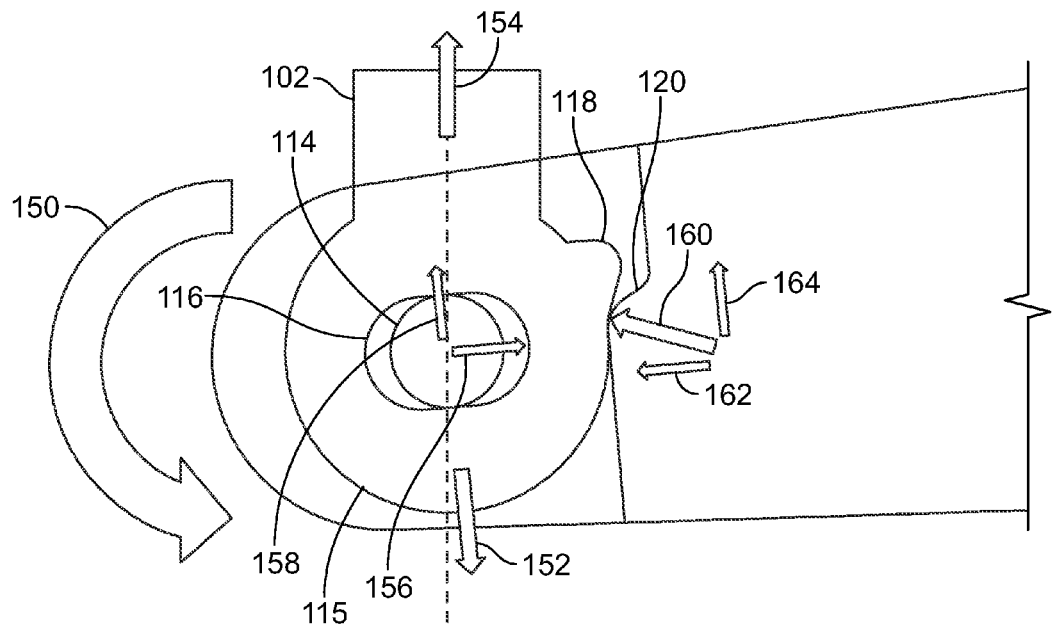
FIG. 3 is a diagrammatic representation of a top view of a cross section of the bellcrank system shown in FIG. 1 further depicting example forces in the bellcrank system.

In order to achieve the substantially linear motion, the dual-cam arrangement balances forces that result when a moment is applied to the bellcrank 104 by the actuating device 112. FIG. 3 depicts in detail the interaction of the various components in the bellcrank system 100 and example forces that act upon various components of the bellcrank system 100. This dual-cam approach balances the forces imparted upon the rod-end 115 of the flexible shaft 102, so that the flexible shaft can move in a substantially linear motion.

With reference to FIG. 3, the bellcrank 104 is rotated via a moment 150 imparted on the first pivot pin 110 (see FIG. 1) created by the actuating device 112 (see FIG. 1). This moment 150 results in a bellcrank force 152 and a tension force 154 being applied to the flexible shaft 102. The tension force 154 is resolved into second pivot pin 114 reactions $R_x$ 156 and $R_y$ 158. The second pivot pin 114 is captured within the slotted hole 116, which as described above acts as the first cam. If unsupported, the second pivot pin 114 would tend to slide towards the first pivot pin 110 via second pivot pin 114 reaction $R_x$ 156. This would result in side loading being applied to the flexible shaft 102. However, the second cam of cam surface 120 prevents this side loading by applying a counter reaction Cam R 160. Cam R 160 has components Cam $R_x$ 162 and Cam $R_y$ 164. The counter-reaction Cam $R_x$ 162 counters second pivot pin 114 reaction $R_x$ 156, and this counter reaction helps to keep the flexible shaft 102 moving with a substantially linear motion. In particular, this second cam 120 is configured to appropriately position the second pivot pin 114 as the bellcrank 104 is rotated thereby converting the rotating motion into substantially linear motion. In doing so, this would effectively relieve the side-loading that would otherwise be applied to the unsupported flexible shaft 102. This second cam 120 is machined into what is traditionally a flat portion of the bottom of the clevis. The second cam 120 impinges on the rod-end 115 of the flexible shaft 102 and it tracks to a resulting straight line of motion to reduce or eliminate side-loading of the flexible shaft.

In an example embodiment, a shape and/or size of the follower surface and a shape and/or size of the cam surface are selected based at least in part on (i) a degree of rotation imparted on the bellcrank by the actuating device and (ii) a length of the first arm and a length of the second arm. In order to select the shapes and size, a kinematics analysis or graphical method may be applied to determine which shapes and sizes will result in the flexible shaft following a substantially linear path. In an example, the shapes and/or sizes are different for bellcranks that are configured to rotate different amounts during operation. For example, the shapes and/or sizes for a bellcrank that is configured to rotate 5 degrees may be different than the shapes and/or sizes for a bellcrank that is configured to rotate 15 degrees. Further, the shapes and/or sizes may be different for bellcranks that are different sizes. For example, the shapes may be different for a bellcrank that has an arm length of 5 inches than for a bellcrank that has an arm length of 10 inches.

Other factors may also be used for selecting a shape and/or size of the follower surface and a shape and/or size of the cam surface. For instance, in an example embodiment, the shape and/or size of the follower surface and a shape and/or size of the cam surface is selected at least in part based on the size of the rod-end 115 of the flexible shaft 102. In another example embodiment, the shape and/or size of the follower surface and a shape and/or size of the cam surface is selected at least in part based on the length of the bellcrank first arm 106 relative to the second arm 108 to achieve a desired mechanical advantage. In yet another example embodiment, the shape and/or size of the follower surface and a shape and/or size of the cam surface is selected at least in part based on the location of the bellcrank's pivot pin relative to the rod-end 115 of the flexible shaft 102. The example depicted mechanism results in the flexible shaft 102 being perpendicular to the second arm 108 for illustration purposes only. In yet another example embodiment, the shape and/or size of the follower surface and a shape and/or size of the cam surface is selected at least in part based on the size of the second (rod-end) pivot pin 114. Other factors are possible as well.

In an example embodiment, the follower surface 118 has a curved shape, and the cam surface 120 also has a curved shape. As shown in FIGS. 2a-2k, these curved shapes may be different from one another. The shapes are selected so that the flexible shaft 102 will follow a substantially linear path when force is applied to rotate the bellcrank first arm 106.

Figure 7:
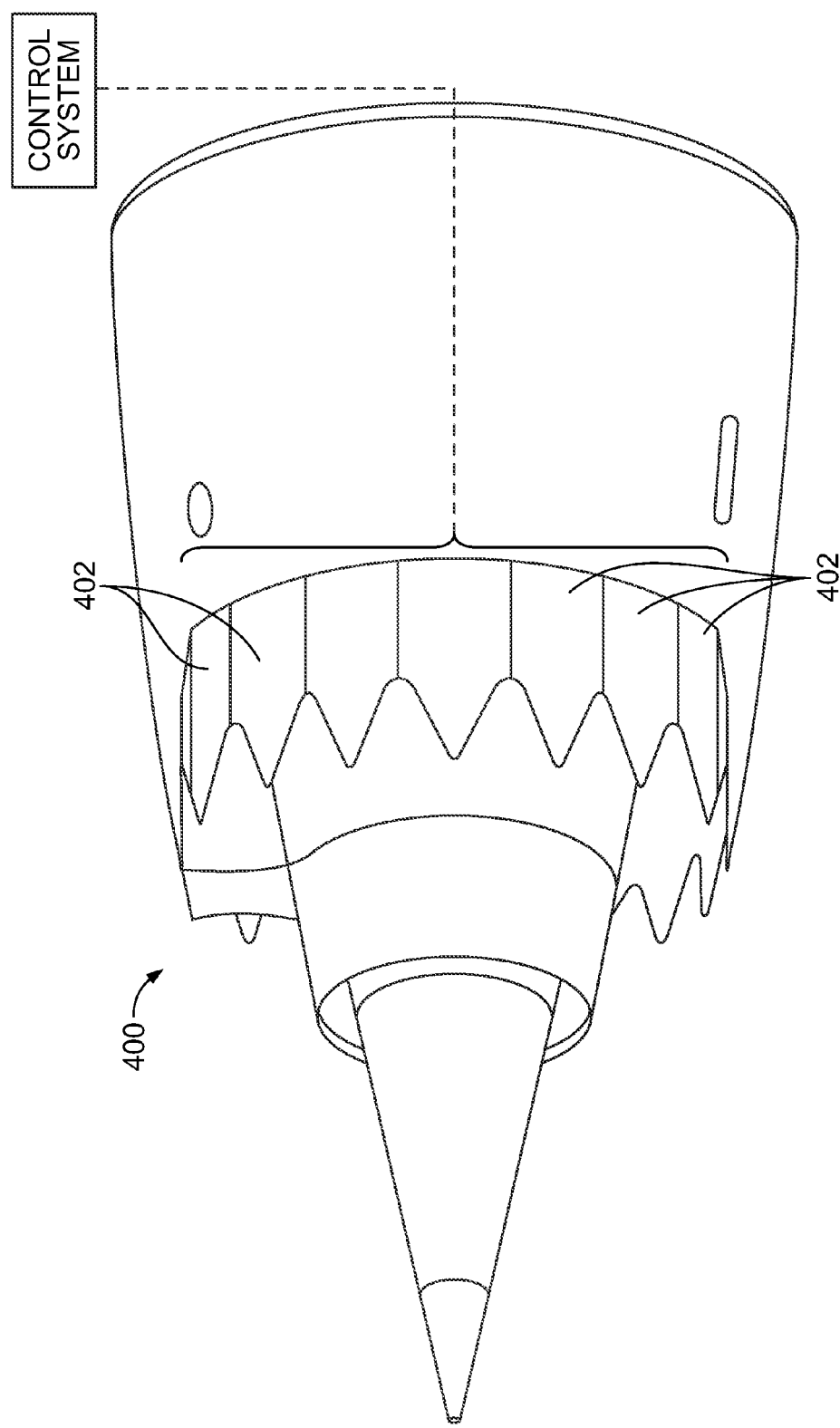
FIG. 7 depicts a diagrammatic representation of a perspective view of a variable area fan nozzle (VFAN) in which a bellcrank in accordance with an exemplary embodiment can be implemented.

As indicated above, in an example embodiment, the bellcrank system 100 is a bellcrank of a VAFN. In this example, the flexible shaft 102 is connected to one or more petals of a VAFN. An example VAFN 400 with a plurality of petals 402 is shown in FIG. 7. However, it should be understood that the bellcrank and flexible shaft may be implemented in another system. For instance, bellcranks with push-pull cables are commonly used in pressurized doors such as a passenger door for airplanes. Therefore, in an example embodiment, the disclosed bellcrank system is used in such an application. As still other examples, the bellcrank system may be implemented in another aerospace application or an application in another industry such as the automotive industry, the construction industry, or the agricultural industry. The bellcrank system 100 may be used in other scenarios as well. In general, the bellcrank system may be used in scenarios where imparting linear motion via a bellcrank is desired.

In an example embodiment, the flexible shaft is made of any suitable flexible material, such as metal or fiber-reinforced plastic. Further, although the shaft 102 is primarily described as a flexible shaft, in other embodiments, the shaft may be a rigid (i.e., non-flexible) shaft.

Further, in an example embodiment, the bellcrank is configured to rotate between about 0 and 10 degrees about the first pivot pin 110. Such angles of operation are common in VAFNs. However, in other embodiments, the degree of rotation may be more than 10 degrees. In general, the bellcrank may be configured to rotate any amount to achieve a desired amount of linear movement of the shaft 102. For instance, in one embodiment, the bellcrank may be configured to rotate up to about 45 degrees. In another embodiment, the bellcrank may be configured to rotate significantly more than 45 degrees. Other examples are possible as well.

Figure 4:
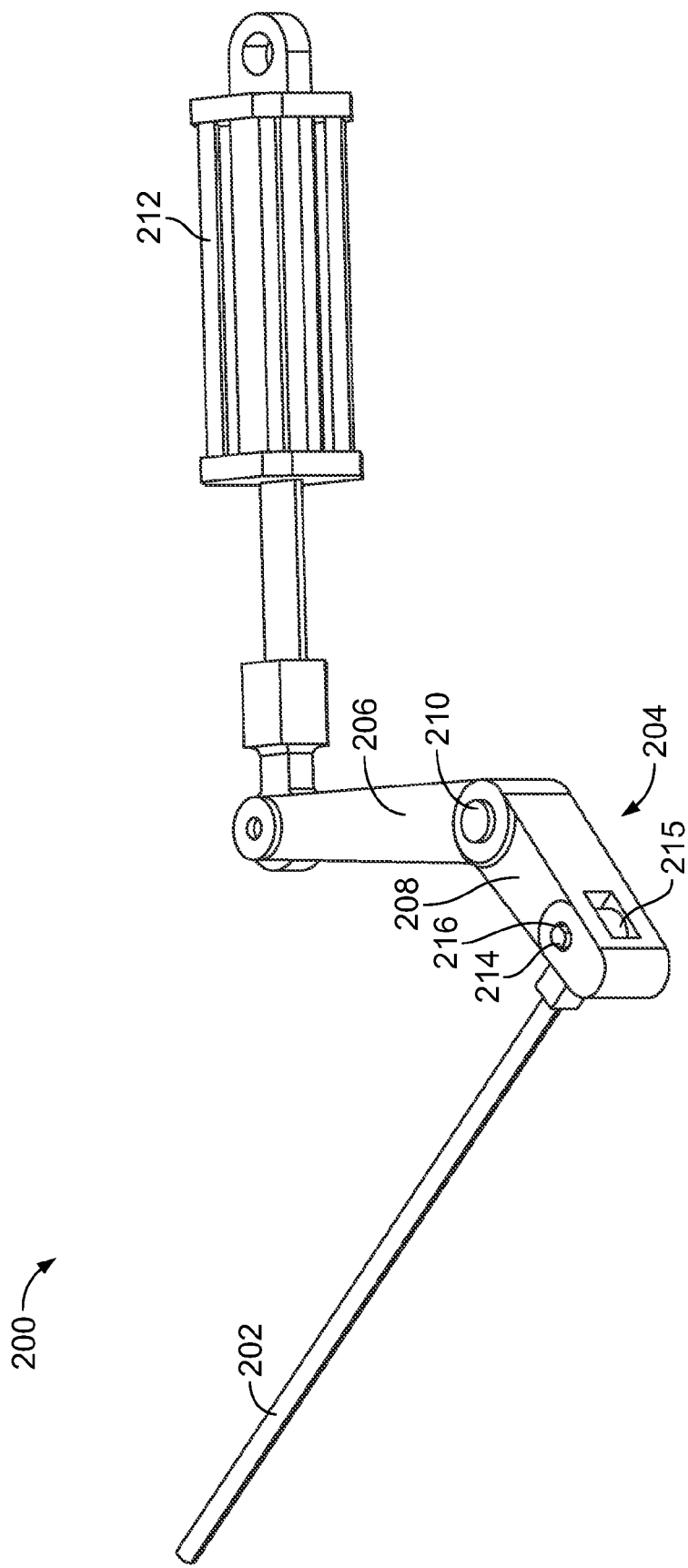
FIG. 4 depicts a diagrammatic representation of a perspective view of another bellcrank system in accordance with an exemplary embodiment.

FIG. 4 is another example bellcrank system 200 in accordance with an exemplary embodiment. Bellcrank system 200 is similar in some respects to the bellcrank system 100, and thus is not described in as great of detail. It should be explicitly noted, however, that any possibilities and permutations described above with respect to bellcrank system 100 may equally apply to bellcrank system 200, and vice versa.

In particular, bellcrank system 200 includes many of the same elements as bellcrank system 100; however, in bellcrank system 200, the second arm further includes a second cam surface machined on the second arm, and there is also a second follower surface on the rod-end of the flexible shaft. Similar to the bellcrank system 100, bellcrank system 200 may be considered a dual-cam bellcrank system. In particular, similar to bellcrank system 100, the slotted hole can be considered the first cam. Further, the profile cut-out within the clevis can be considered the second cam. However, in system 200, this second cam now has primary and secondary cam surfaces. In particular, the primary cam surface of the second cam is the first cam surface and the secondary cam surface of the second cam is the second cam surface. As seen in FIG. 4, bellcrank system 200 has an enclosed clevis, in contrast to the open clevis of bellcrank system 100 (as seen in FIG. 1). This enclosed clevis allows for the secondary cam surface of the second cam.

Figure 5A:
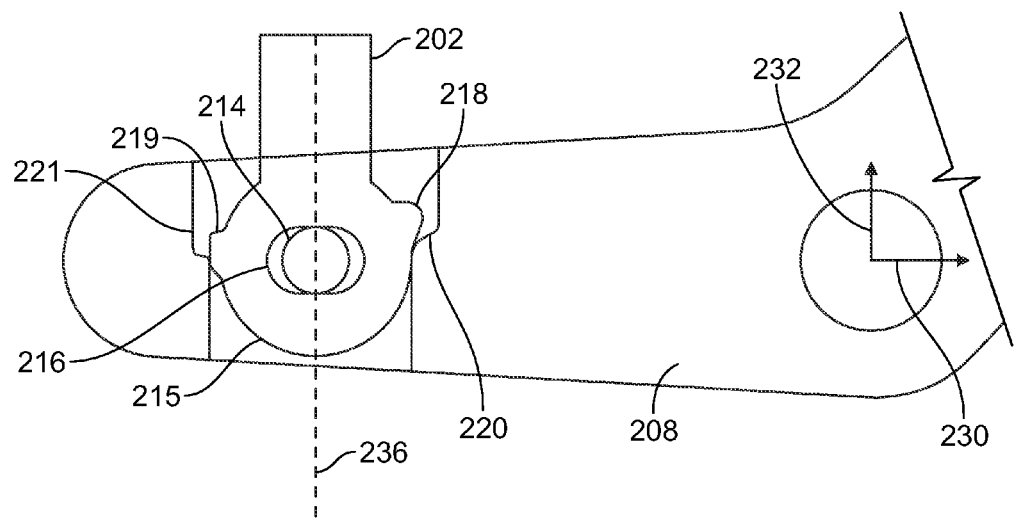
FIGS. 5*a*-5*k* are each a diagrammatic representation of a top view of a cross section of the bellcrank system shown in FIG. 4.

Bellcrank system 200 is described with reference to FIGS. 4, 5a-k, and 6. The bellcrank system 200 is a dual-cam bellcrank system that imparts a linear motion to flexible shaft 202. The bellcrank system 200 includes a bellcrank 204 having a first arm 206, a second arm 208, and a first pivot pin 210 therebetween. The system 200 further includes an actuating device 212 coupled to the first arm 206 and configured to apply a force to cause the bellcrank 204 to rotate about the first pivot pin 210. The system 200 also includes a second pivot pin 214 coupled to a rod-end 215 of the flexible shaft 202 and further coupled to a slotted hole 216 on the second arm 208. With reference to FIG. 5a, the system 200 further includes a first follower surface 218 on the rod-end 215 of the flexible shaft 202 and configured to slide on a cam surface 220 machined on the second arm 208. Still further, the system 200 includes a second follower surface 219 on the rod-end 215 of the flexible shaft 202 and configured to slide on a cam surface 221 machined on the second arm 208. Upon application of the force to the first arm 206, the flexible shaft 202 moves in a substantially linear motion. The first follower surface 218 is a projection on the rod-end 215 of the flexible shaft 202, and the first cam surface 220 is a track machined on the second arm 208. Further, the second follower surface 219 is a projection on the rod-end 215 of the flexible shaft 202, and the second cam surface 221 is a track machined on the second arm 208.

As mentioned above, the bellcrank system 200 is a dual-cam bellcrank that includes two cams within the clevis of the bellcrank itself. With reference to FIG. 5a, the first cam is the slotted hole 216 and the second cam is a cam having primary and secondary surfaces (i.e., cam surfaces 220 and 221) machined on the second arm 208. This disclosed dual-cam arrangement forces the flexible shaft 202 to move along a substantially linear path as the bellcrank 204 is rotated. In an example embodiment, the secondary cam surface (i.e., cam surface 221) is on an opposite side of the rod-end 215 of the flexible shaft 202 as the primary cam surface (i.e., track 220), as shown in FIGS. 5a-5k and 6.

Figure 5B:
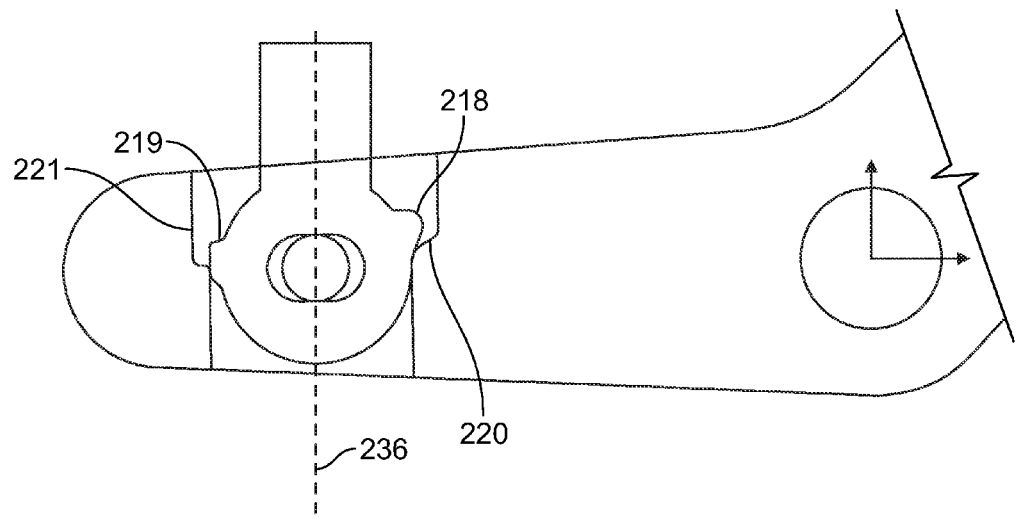
Figure 5C:
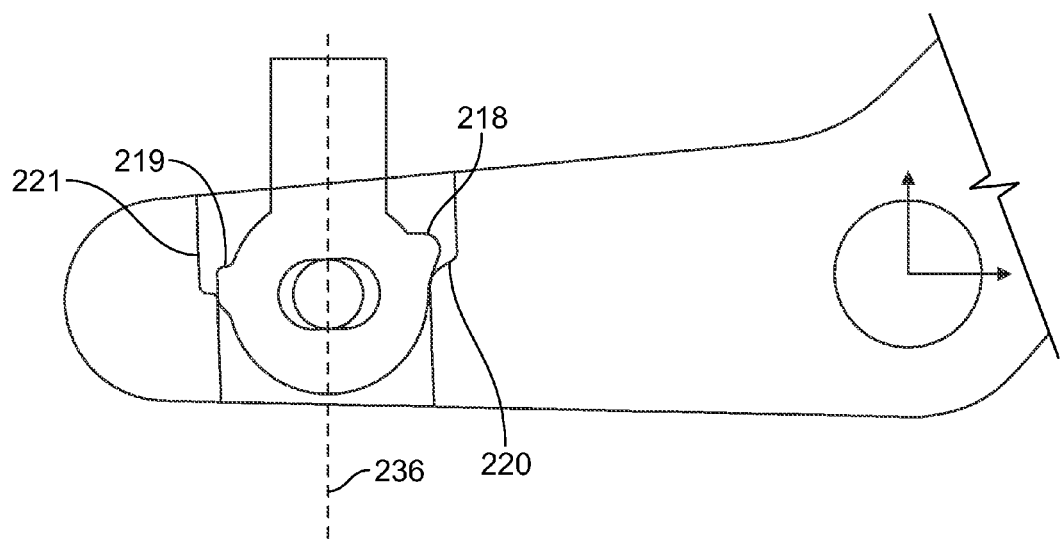
Figure 5D:
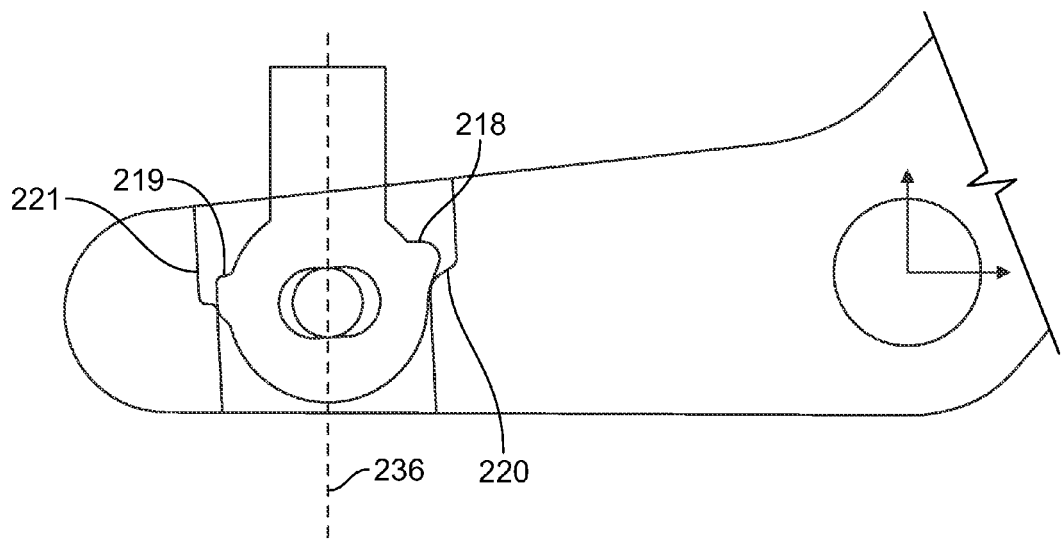
Figure 5E:
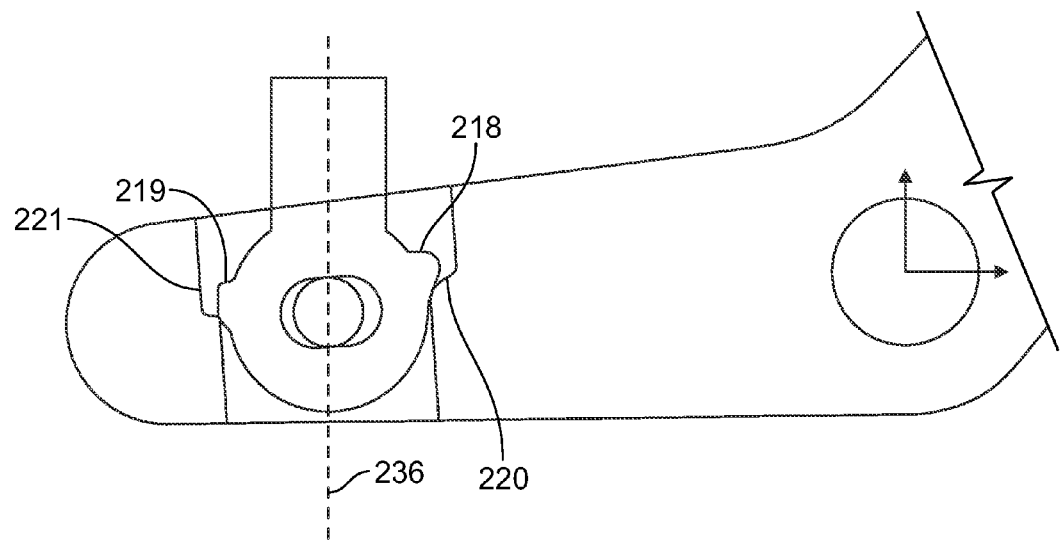
Figure 5F:
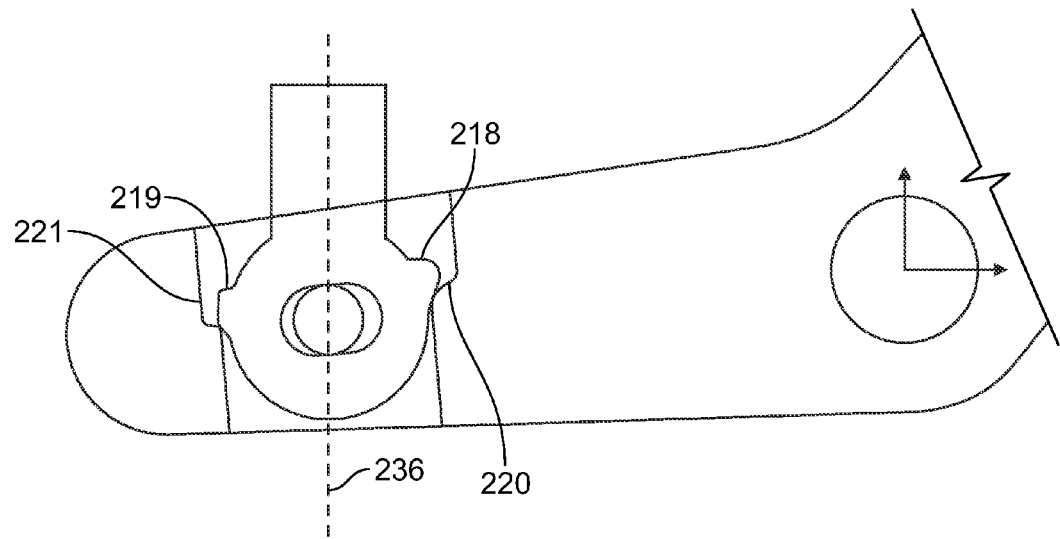
Figure 5G:
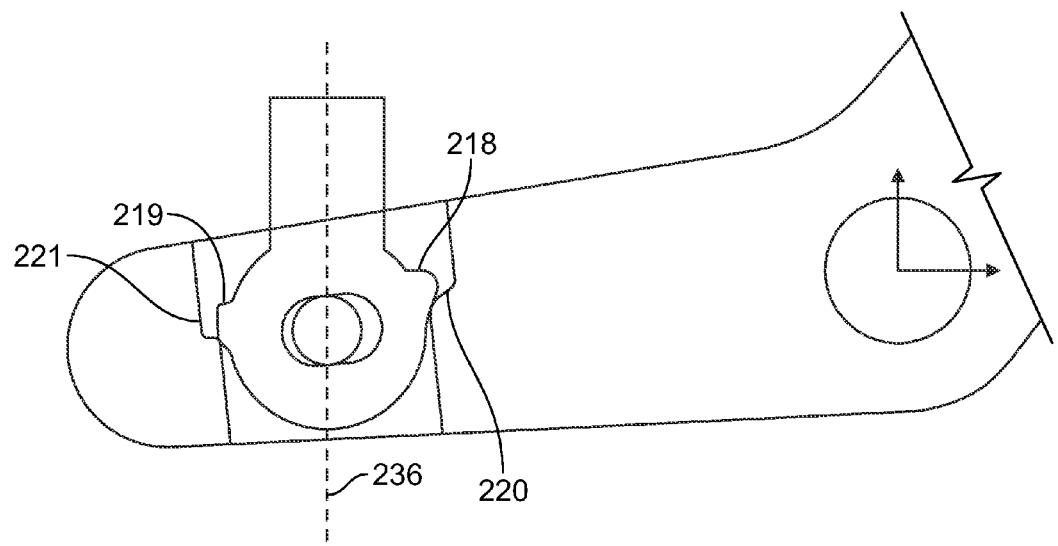
Figure 5H:
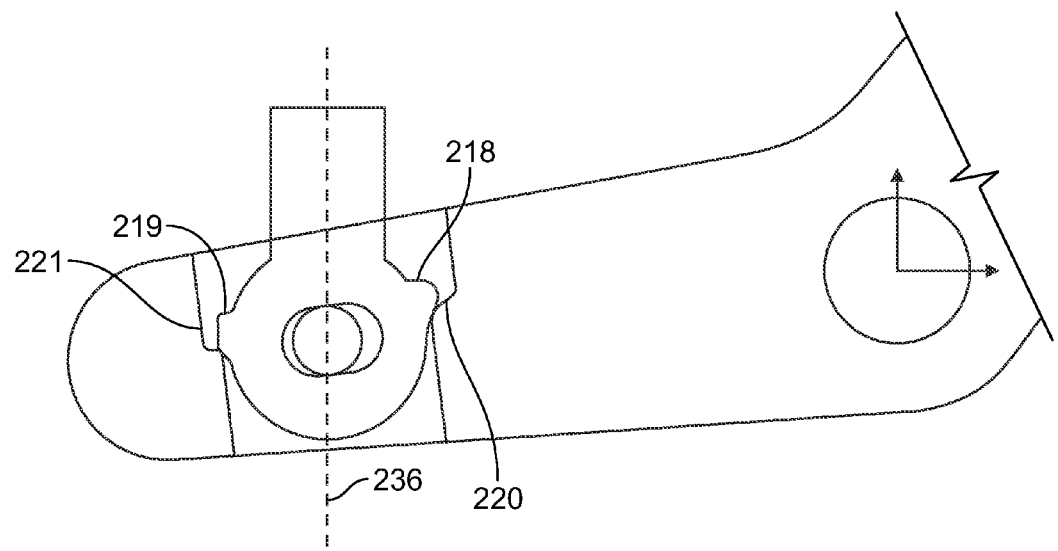
Figure 5I:
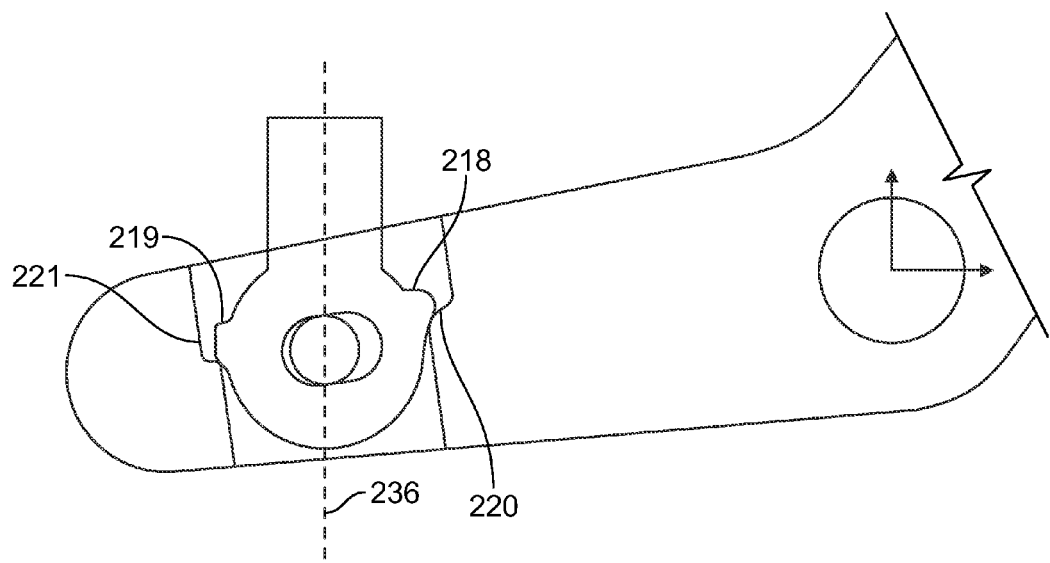
Figure 5J:
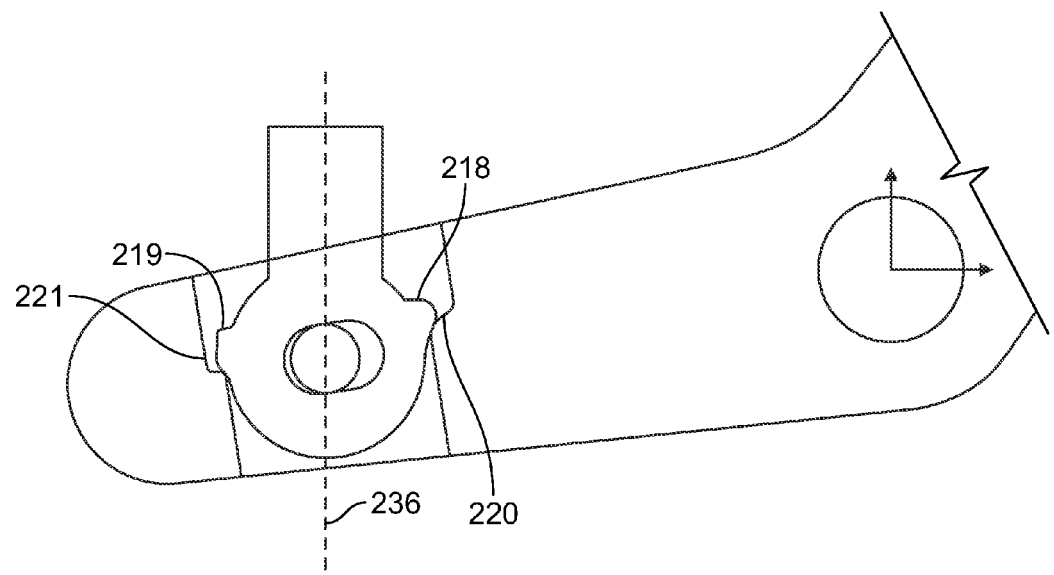
Figure 5K:
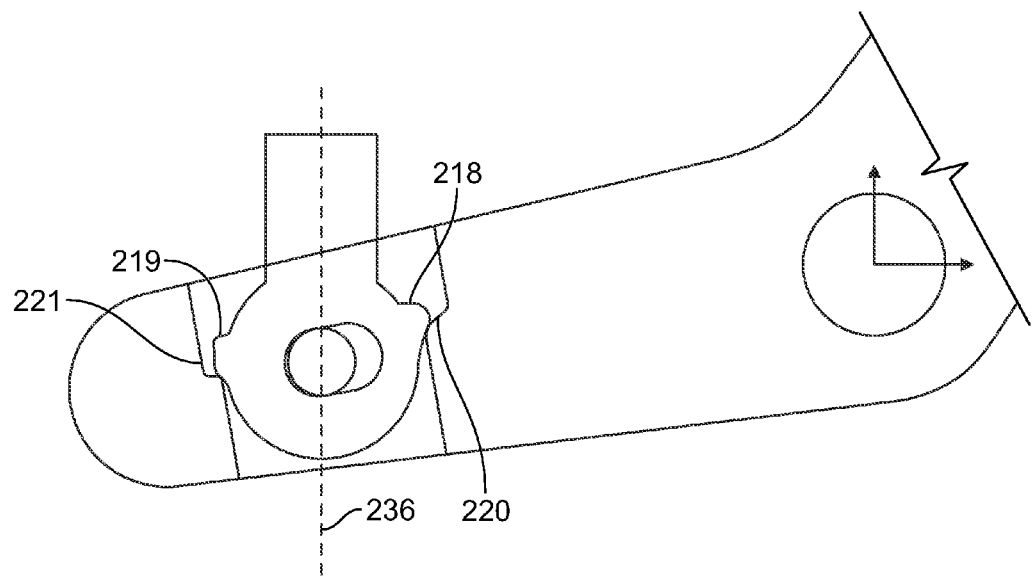

This substantially linear motion is described in further detail with reference to FIGS. 5a-5k. As shown in these Figures, the bellcrank rotates about a Z-axis which is perpendicular to the XY plane (defined by X-axis 230 and Y-axis 232). FIGS. 5a-5k depict the bellcrank 204 at various degrees of rotation. In particular, FIG. 5a depicts the bellcrank at an initial state of operation before the actuating device 212 applies a force to rotate the bellcrank 204. After the actuating device 212 applies a force, the bellcrank is rotated. FIGS. 5b-5k each depict the bellcrank after 1 additional degree of rotation (i.e., FIG. 5b depicts the bellcrank after a rotation of 1 degree, FIG. 5c depicts the bellcrank after a rotation of 2 degrees, and so forth).

As shown in these Figures, during this rotation, the flexible shaft 202 moves in a substantially linear motion along a substantially linear path. In particular, throughout the entire rotation of the bellcrank 204 about first pivot pin 210, the flexible shaft 202 follows a substantially linear motion along line 236 (which is parallel to the Y-axis 232).

Figure 6:
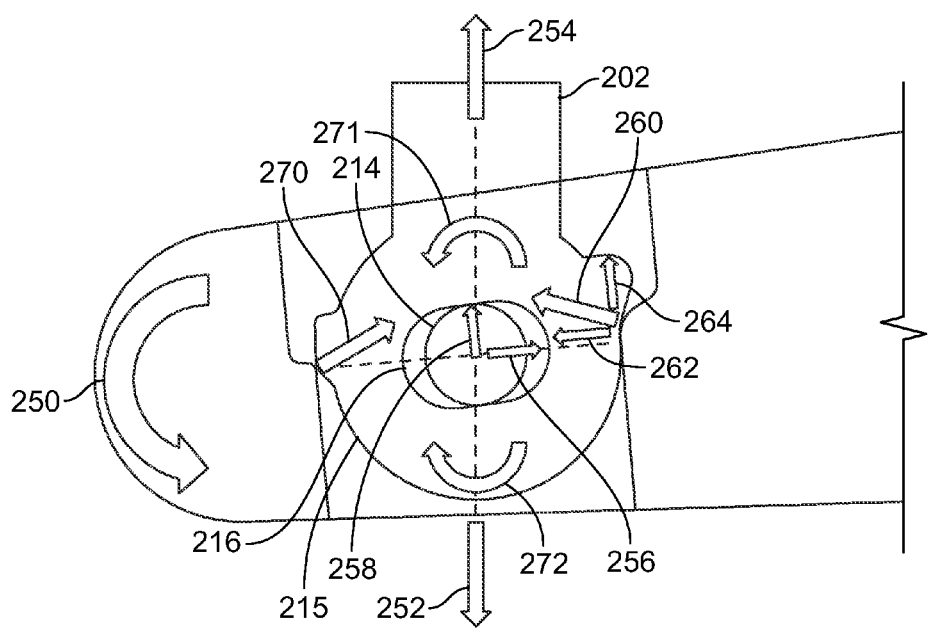
FIG. 6 is a diagrammatic representation of a top view of a cross section of the bellcrank system shown in FIG. 4 further depicting example forces in the bellcrank system.

In order to achieve the substantially linear motion, the dual-cam arrangement balances forces that result when a moment is applied to the bellcrank 204 by the actuating device 212. FIG. 6 depicts in detail interaction of the various components in the bellcrank system 200 and forces that act upon various components of the bellcrank system 200. This dual-cam approach balances the forces imparted upon the rod-end 215 of the flexible shaft 202, so that the flexible shaft can move in a substantially linear motion.

The bellcrank 204 is rotated via a moment 250 imparted on the first pivot pin 210 created by the actuating device 212. This moment 250 results in a bellcrank force 252 and a tension force 254 being applied to the flexible shaft 202. The tension force 254 is resolved into second pivot pin 214 reactions into second pivot pin reactions $R_x$ 256 and $R_y$ 258. The second pivot pin 214 is captured within the slotted hole 216, which as described above acts as the first cam. If unsupported, the second pivot pin 214 would tend to slide towards the first pivot pin 210 via pin reaction $R_x$ 256. This would result in side loading being applied to the flexible shaft 202. However, track 220 of the second cam as shown prevents this by applying a counter reaction $Cam_{2R}$ R 260. $Cam_{2R}$ R 260 has components $Cam_{2R}$ $R_x$ 262 and $Cam_{2R}$ $R_y$ 264. The counter-reaction $Cam_{2R}$ $R_x$ 262 counters second pivot pin reaction $R_x$ 256.

An induced moment 271 of the rod-end 215 is due to a resultant force vector from counter reaction $Cam_{2R}$ R 260 not being pointed toward the second pivot pin 214 and therefore tending to rotate the rod-end 215. Cam 2L is incorporated to counter this induced moment 271. The opposing cam surface (i.e., the secondary cam surface or track 221 of the second cam) also acts to counter the induced moment 271 generated by $Cam_{2R}$ R 260. In particular, this opposing cam surface 221 produces a counter force $Cam_{2L}$ R 270 which generates a counter-moment 272 that reacts against the induced moment 271. Beneficially, this secondary cam surface 221 can take up any incidental back-driving of the mechanism in the slotted hole 216 should the flexible shaft load 254 reverse itself (e.g., tension force to compression force) during the course of operation of the bellcrank system 200.

In an example embodiment, a shape of the first follower surface, a shape of the first cam surface, a shape of the second follower surface, and a shape of the second cam surface are selected based at least in part on (i) a degree of rotation imparted on the bellcrank by the actuating device and (ii) a length of the first arm and the second arm. The shapes may be selected based on other factors as well. In order to select the shapes, a kinematics analysis or graphical method may be applied to determine which shapes will result in the flexible shaft following a substantially linear path.

In an example embodiment, the "single cam" configuration shown in FIGS. 1, 2a-k, and 3 is suitable when the flexible shaft is always in tension. In an example, if the flexible shaft were to go in compression, then it would back-drive the pin down along the slotted hole. Beneficially, the "double cam" configuration shown in FIGS. 4, 5a-k, and 6 can accommodate tension only and push-pull (tension/compression) operations.

3. Example Method

Figure 8:
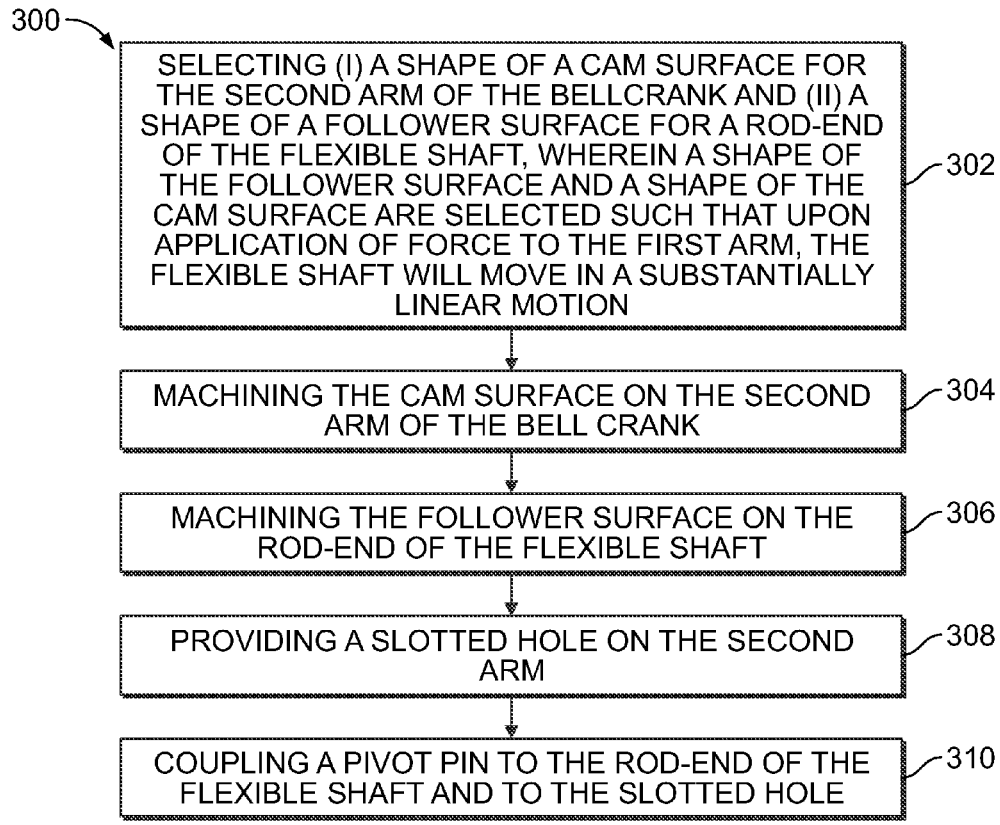
FIG. 8 is a flow chart depicting functions that can be carried out in accordance with an example method.

FIG. 8 is a method 300 that can be carried out in accordance with the present disclosure. Method 300 is a method for manufacturing a system comprising a bellcrank coupled to an end of a flexible shaft, the bellcrank comprising a first arm, a second arm and a pivot therebetween.

As shown in FIG. 8, at block 302, the method involves selecting (i) a shape of a cam surface for the second arm of the bellcrank and (ii) a shape of a follower surface for a rod-end of the flexible shaft, wherein a shape of the follower surface and a shape of the cam surface are selected such that upon application of force to the first arm, the flexible shaft will move in a substantially linear motion. Further, the method involves, at block 304, machining the cam surface on the second arm of the bellcrank. Still further, the method involves, at block 306, machining the follower surface on the rod-end of the flexible shaft. Yet still further, the method involves, at block 308, providing a slotted hole on the second arm and, at block 310, coupling a pivot pin to the rod-end of the flexible shaft and to the slotted hole. In an example embodiment, the shape and/or size of the cam surface and the shape of the follower surface are determined based at least in part on (a) a degree of rotation to be imparted on the bellcrank by an actuating device and (b) a length of the second arm.

In an example embodiment, the method 300 may also involve forming the secondary cam surface on the second cam of the dual-cam bellcrank. In particular, in this embodiment, the method 300 further involves (a) selecting (i) a shape of a second cam surface for the second arm of the bellcrank and (ii) a shape of a second follower surface for the rod-end of the flexible shaft, (b) machining the second follower surface on the rod-end of the flexible shaft, and (c) machining the second cam surface on the second arm.

Figure 9:
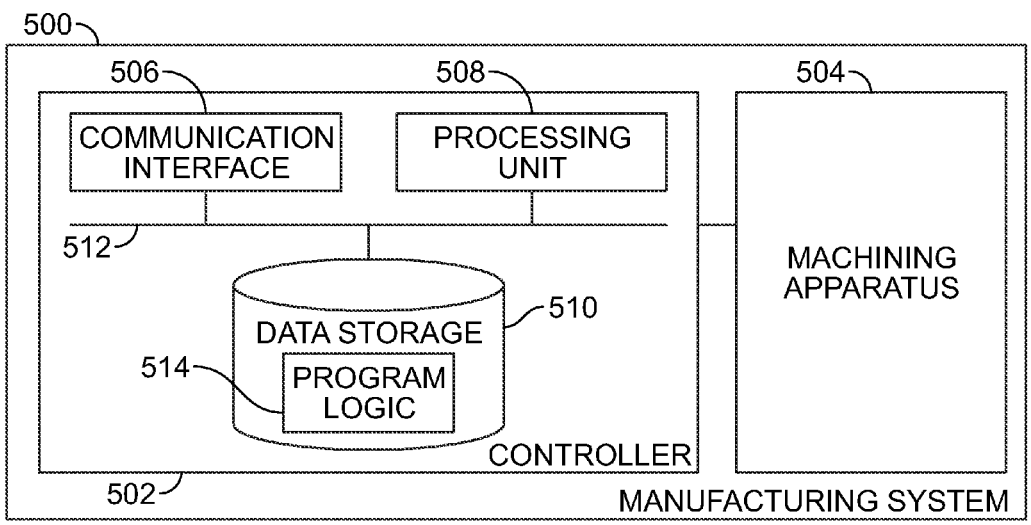
FIG. 9 is a simplified block diagram of a system that can carry out a method in accordance with an exemplary embodiment, such as the method depicted in FIG. 8.

FIG. 9 is next a simplified block diagram of a manufacturing system 500. In an example embodiment, the functions of method 300 are carried out by a manufacturing system such as manufacturing system 500. The manufacturing system 500 of FIG. 9 includes by way of example a controller 502 and a machining apparatus 504. The controller 502 is in communication with the machining apparatus 504 and is configured to control the operation of the machining apparatus 504. Machining apparatus 504 may include any suitable machining components.

In an example embodiment, the machining apparatus 504 includes a component positioning apparatus. In this example embodiment, the component positioning apparatus comprises one or more robotic arms that grip components (e.g., bellcrank) and moves the components into the desired position. For instance, in an example, the component positioning apparatus is a gripper that includes mechanical fingers. In another example, the component positioning apparatus is a grooved table bed with toggle clamps that can secure and hold down components. Other examples are possible as well.

As indicated above, the machining apparatus 504 is configured to machine the cam surfaces on the arm of the bellcrank, as well as machine the slotted holed on the bellcrank second arm. Machining apparatus 504 may be any suitable apparatus configured to machine these features. In an example embodiment, the machining apparatus comprises a mill or milling device. In another embodiment, the machining apparatus comprises a drill or punching apparatus. In yet another embodiment, the machining apparatus may be comprised of a single axis or multi-axis machining system. Other example machining devices are possible as well.

The machining apparatus 504 may be controlled automatically by controller 502 and/or manually by an operator. For instance, in an example embodiment, controller 502 controls the operation of the machining apparatus. FIG. 9 depicts some of the physical components that such a controller may include. As shown in FIG. 9, the controller 502 may include a communication interface 506, a processing unit 508, and data storage 510, all of which are communicatively linked together by a system bus, network, or other connection mechanism 512. With this arrangement, the communication interface 506 functions to provide for communication with various other manufacturing elements and may thus take various forms, allowing for wired and/or wireless communication for instance. Processing unit 508 may comprise one or more general purpose processors (e.g., microprocessors) and/or one or more special purpose processors (e.g., application specific integrated circuits) and may be integrated in whole or in part with the communication interface. And data storage 510 may comprise one or more volatile and/or non-volatile storage components, such as optical, magnetic, or flash memory and may be integrated in whole or in part with the processing unit. As shown, by way of example, data storage 510 comprises program logic/instructions 514, which are executable by processing unit 508 to carry out various functions described herein. In an exemplary embodiment, data storage 510 includes program logic/instructions 514 that are executable to cause the manufacturing system 500 to carry out the steps of: (a) selecting (i) a shape of a cam surface for the second arm of the bellcrank and (ii) a shape of a follower surface for a rod-end of the flexible shaft, wherein the shape of the follower surface and the shape of the cam surface are selected such that upon application of force to the first arm, the flexible shaft will move in a substantially linear motion; (b) machining the cam surface on the second arm of the bellcrank; and (c) machining the follower surface on the rod-end of the flexible shaft.

4. Conclusion

Exemplary embodiments have been described above. Those skilled in the art will understand, however, that changes and modifications may be made to these embodiments without departing from the true scope and spirit of the disclosure. The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed:

1. A system for imparting a linear motion to a flexible shaft, the system comprising:
    a bellcrank having a first arm, a second arm, and a first pivot pin therebetween;
    an actuating device coupled to the first arm and configured to apply a force thereto to cause the bellcrank to rotate about the first pivot pin;
    a second pivot pin coupled to a rod-end of the flexible shaft and further coupled to a slotted hole on the second arm;
    a follower surface on the rod-end of the flexible shaft and configured to slide on a cam surface machined on the second arm; and
    wherein upon application of the force to the first arm, the flexible shaft moves in a substantially linear motion such that a path of the flexible shaft follows a linear path and does not deviate from the linear path more than a threshold amount, wherein the threshold amount is between +/−0.001 and 0.010 inches.

2. The system of claim 1, wherein a shape of the follower surface and a shape of the cam surface are selected based at least in part on (i) a degree of rotation imparted on the bellcrank by the actuating device and (ii) a length of the first arm and a length of the second arm.

3. The system of claim 1, wherein, when the follower surface slides on the cam surface, an interaction of the follower surface on the cam surface produces a cam reaction that counters a reaction of the second pivot pin, such that the second pivot pin moves in the substantially linear motion.

4. The system of claim 1, wherein the slotted hole has (i) a width that substantially corresponds to a diameter of the second pivot pin and (ii) a length that is greater than the diameter of the second pivot pin.

5. The system of claim 4, wherein the slotted hole moves laterally relative to the second pivot pin when the flexible shaft moves in the substantially linear motion.

6. The system of claim 1, wherein the follower surface comprises a first curved shape, and wherein the cam surface comprises a second curved shape different from the first curved shape.

7. The system of claim 1, further comprising a second follower surface on the rod-end of the flexible shaft and configured to slide on a second cam surface machined on the second arm.

8. The system of claim 1, wherein the flexible shaft is a flexible shaft of a variable area fan nozzle (VAFN).

9. The system of claim 8, wherein the bellcrank is configured to rotate at least between 0 and 10 degrees about the first pivot pin.

10. The system of claim 1, wherein the flexible shaft comprises a metal or fiber-reinforced plastic material.

11. A system for imparting a linear motion to a flexible shaft, the system comprising:
    a bellcrank having a first arm, a second arm, and a first pivot pin therebetween;
    an actuating device coupled to the first arm and configured to apply a force thereto to cause the bellcrank to rotate about the first pivot pin;
    a second pivot pin coupled to a rod-end of the flexible shaft and further coupled to a slotted hole on the second arm;
    a first follower surface on the rod-end of the flexible shaft and configured to slide on a first cam surface machined on the second arm;
    a second follower surface on the rod-end of the flexible shaft and configured to slide on a second cam surface machined on the second arm, wherein the second follower surface is located on an opposite side of the rod-end of the flexible shaft as the first follower surface; and
    wherein upon application of the force to the first arm, the flexible shaft moves in a substantially linear motion such that a path of the flexible shaft follows a linear path and does not deviate from the linear path more than a threshold amount, wherein the threshold amount is between +/−0.001 and 0.010 inches.

12. The system of claim 11, wherein a shape of the first follower surface, a shape of the first cam surface, a shape of the second follower surface, and a shape of the second cam surface are selected based at least in part on (i) a degree of rotation imparted on the bellcrank by the actuating device and (ii) a length of the first arm and a length of the second arm.

13. The system of claim 12, wherein the bellcrank is configured to rotate at least between 0 and 10 degrees about the first pivot pin.

14. A method comprising:
manufacturing the system of claim 1, wherein manufacturing the system of claim 1 comprises:
selecting (i) a shape of the cam surface and (ii) a shape of the follower surface, wherein the shape of the follower surface and the shape of the cam surface are selected such that upon application of the force to the first arm, the flexible shaft will move in the substantially linear motion such that the path of the flexible shaft follows the linear path and does not deviate from the linear path more than the threshold amount, wherein the threshold amount is between +/−0.001 and 0.010 inches;
machining the cam surface on the second arm of the bellcrank; and
machining the follower surface on the rod-end of the flexible shaft.

15. The method of claim 14, wherein the shape of the cam surface and the shape of the follower surface are determined based at least in part on (a) a degree of rotation to be imparted on the bellcrank by the actuating device and (b) a length of the first arm and the second arm.

16. The method of claim 14, further comprising providing the first pivot pin in a pivot between the first arm and the second arm.

17. The method of claim 16, further comprising:
providing the slotted hole on the second arm; and
coupling the second pivot pin to the rod-end of the flexible shaft and to the slotted hole.

18. The method of claim 14, further comprising:
selecting (i) a shape of a second cam surface for the second arm of the bellcrank and (ii) a shape of a second follower surface for the rod-end of the flexible shaft;
machining the second follower surface on the rod-end of the flexible shaft; and
machining the second cam surface on the second arm.

19. The method of claim 14, wherein the flexible shaft is a flexible shaft of a variable area fan nozzle (VAFN).

* * * * *